(12) United States Patent
Kratz et al.

(10) Patent No.: US 8,167,334 B2
(45) Date of Patent: May 1, 2012

(54) GAS GENERATOR FOR AN AIRBAG MODULE

(75) Inventors: Heiko Kratz, Kronberg (DE); Björn Windhausen, Schömberg (DE); Michael Menzel, Rodgau (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 13/038,298

(22) Filed: Mar. 1, 2011

(65) Prior Publication Data
US 2011/0148084 A1    Jun. 23, 2011

Related U.S. Application Data

(63) Continuation of application No. PCT/EP2009/062830, filed on Oct. 2, 2009.

(30) Foreign Application Priority Data

Oct. 8, 2008    (DE) .......................... 10 2008 050 763

(51) Int. Cl.
*B60R 21/264* (2006.01)
*C06D 5/00* (2006.01)
*B01D 50/00* (2006.01)

(52) U.S. Cl. ....... 280/736; 280/741; 102/531; 55/385.3; 55/490

(58) Field of Classification Search .................. 280/736, 280/740, 741, 742; 102/530, 531; 55/490, 55/495, 503, 385.1, 385.3
See application file for complete search history.

(56) References Cited

U.S. PATENT DOCUMENTS

| | | | | |
|---|---|---|---|---|
| 3,230,331 A * | 1/1966 | Lindell | ......................... | 337/275 |
| 3,391,368 A * | 7/1968 | Fahnoe | ........................ | 337/203 |
| 3,719,912 A * | 3/1973 | Harner et al. | ................. | 337/280 |
| 5,100,171 A * | 3/1992 | Faigle et al. | .................. | 280/736 |
| 5,738,373 A | 4/1998 | Siddiqui | | |
| 6,007,098 A | 12/1999 | Olson et al. | | |
| 7,185,588 B2 * | 3/2007 | Clark et al. | .................... | 102/530 |
| 2004/0053182 A1 * | 3/2004 | Yoshida et al. | ............... | 431/352 |
| 2004/0256847 A1 * | 12/2004 | Quioc et al. | ................... | 280/741 |
| 2005/0138909 A1 * | 6/2005 | Hardenburg | .................... | 55/525 |
| 2005/0280252 A1 * | 12/2005 | McCormick | .................. | 280/741 |
| 2006/0273564 A1 * | 12/2006 | McCormick et al. | ......... | 280/740 |
| 2007/0001438 A1 * | 1/2007 | Patterson et al. | ............. | 280/740 |

FOREIGN PATENT DOCUMENTS

| | | |
|---|---|---|
| DE | 44 17 347 A1 | 11/1995 |
| DE | 195 43 795 A1 | 5/1997 |
| DE | 198 02 355 A1 | 7/1999 |
| WO | WO-2005/042310 A2 | 5/2005 |

OTHER PUBLICATIONS

International Preliminary Report on Patentability (IPRP) in PCT/EP2009/062830 dated Apr. 21, 2011.
International Search Report in PCT/EP2009/062830 dated Dec. 29, 2009.
German Examination Report for application No. 10 2008 050 763.6 dated Jul. 4, 2011, 5 pages.

* cited by examiner

*Primary Examiner* — Joseph Rocca
(74) *Attorney, Agent, or Firm* — Foley & Lardner LLP

(57) ABSTRACT

The invention relates to a gas generator for an airbag module, comprising a housing, and a filter fastened in the housing for filtering a gas that can be generated with the gas generator. According to the invention, it is provided that a part of the gas generator is inserted into a recess of the filter for fastening the filter in the housing.

14 Claims, 2 Drawing Sheets

GAS GENERATOR FOR AN AIRBAG MODULE

CROSS-REFERENCE TO RELATED APPLICATIONS

This is a continuation of International Application PCT/EP2009/062830, which has an international filing date of Oct. 2, 2009; this International Application was not published in English, but was published in German as WO 2010/040691 A1. The foregoing international application is incorporated by reference herein.

BACKGROUND

The invention relates to a gas generator as well as to a method for producing a gas generator.

Such a gas generator comprises a housing for carrying the components of the gas generator, particularly a propellant for generating a gas, by means of which a gas sack of a motor vehicle airbag module can be inflated, as well as a filter fastened in the housing for filtering the gas that can be generated by the gas generator, wherein said filter can be designed to cool said gas and/or to retain (filtering) harmful substances, which are generated upon combustion of said propellant.

SUMMARY

It is desirable to provide for a gas generator that can be produced in a simple and cost-effective manner as well as for a corresponding method for producing such a gas generator.

One disclosed embodiment relates to a g as generator, comprising: a housing, and a filter fastened in the housing for filtering gases that can be generated by the gas generator, wherein a part of the gas generator is inserted into a recess of the filter for fastening the filter in the housing; and wherein the part is configured and provided to widen the filter, so that the filter is pressed against the housing for fastening the filter in the housing, wherein said part of the gas generator is formed as a bolt.

Another enclosed embodiment relates to a method for producing a gas generator comprising the steps of: providing a housing of the gas generator, and arranging a filter in the housing for filtering gases that can be generated by the gas generator, such that a part of the gas generator is inserted into a recess of the filter in order to fix the filter in the housing, wherein the part of the gas generator is inserted into said recess along an extension direction of the housing for fixing the filter in the housing, so that the filter widens across said extension direction and pushes against an inside of the housing facing the filter.

It is to be understood that the foregoing general description and the following detailed descriptions are exemplary and explanatory only, and are not restrictive of the invention as claimed.

BRIEF DESCRIPTION OF THE DRAWING

These and other features, aspects, and advantages of the present invention will become apparent from the following description, appended claims, and the accompanying exemplary embodiments shown in the drawings, which are briefly described below.

DETAILED DESCRIPTION

Figure 1:
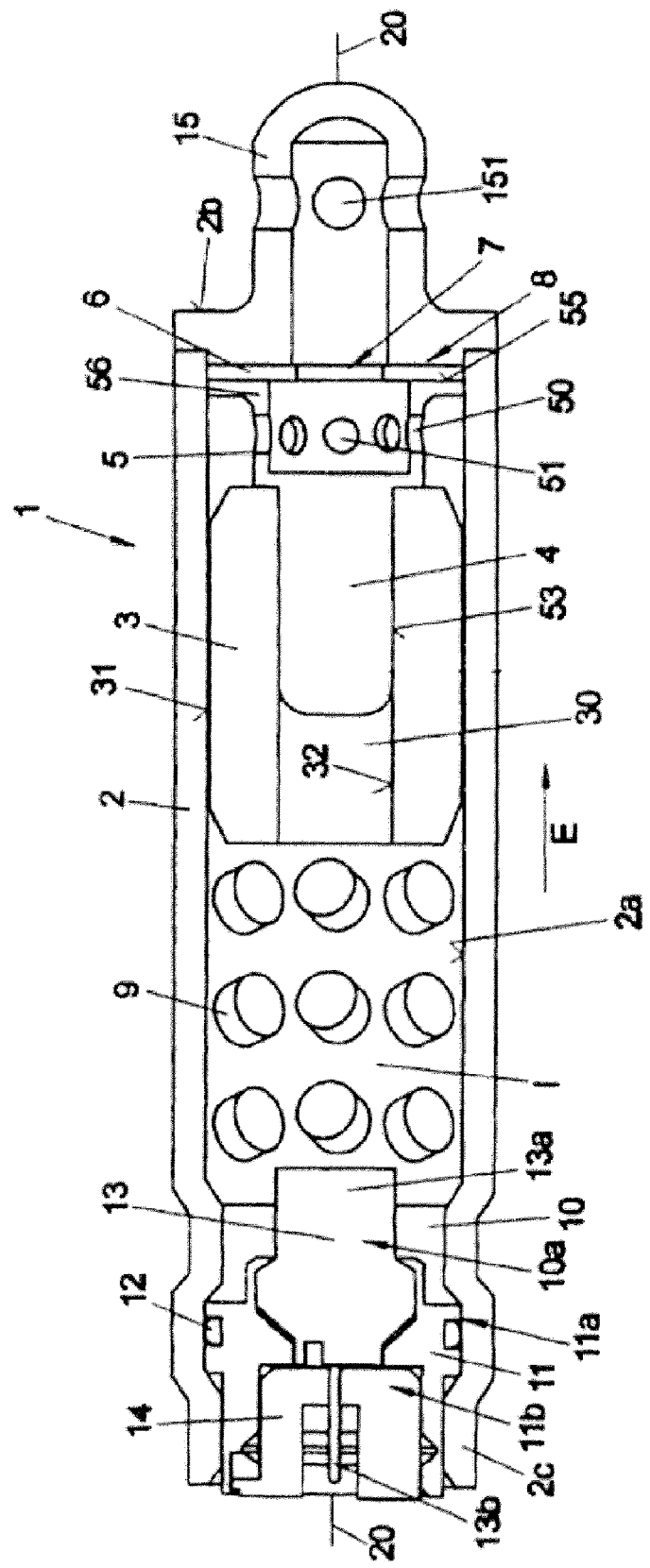
FIG. 1: shows a schematical cross sectional view of a first embodiment of a gas generator according to the invention.

According to one aspect of the invention, it is provided that in order to fasten the filter to the housing of the gas generator, a part of the gas generator is inserted into a recess of the filter.

Particularly, said part of the gas generator arranged in the housing is pressed into said recess, so that the filter widens in cross section and is therefore pressed from an inner space of the housing defined by the housing against the housing. Hereby, the filter is fixed in the housing.

Thus, furthermore, the gas generator can be advantageously sealed by means of an o-ring, since no damage of an inside of the housing facing the inner space of the housing occurs like for instance in case of crimping a filter with the housing.

Particularly, the filter circulates around said part of the gas generator in a closed annular manner. Furthermore, said part of the gas generator is particularly formed as a bolt, which particularly protrudes from a throttle of the gas generator arranged in the housing. Particularly, the bolt is integrally formed with the throttle, so that the bolt and the throttle form a uniform part.

Such a throttle is particularly arranged—from the inner space of the housing—in front of an outflow opening of the gas generator and particularly serves for throttling the gas stream generated by the gas generator as well as eventually for guiding and/or distributing the generated gas.

Particularly, the housing is formed such that it extends longitudinally along and extension direction, wherein the bolt particularly protrudes along the extension direction from the throttle.

Particularly, the gas generator is a so-called tubular gas generator, i.e., the housing of the gas generator is formed at least in sections, particularly over the whole length along the extension direction, as a hollow cylinder having a cylinder axis coinciding with the extension direction.

Particularly, the recess of the filter, into which the part of the gas generator (bolt) is inserted or pressed in, is formed as a through-opening, which particularly aligns with the extension direction, i.e., the through-opening comprises the form of a cylinder-shaped recess, whose cylinder axis coincides with the cylinder axis of the housing.

Particularly, the filter is formed at least in sections, particularly over the whole length along the extension direction, as a hollow cylinder. Thereby, said hollow-cylindrical portion or the filter comprises a cylinder axis that coincides with the cylinder axis of the housing.

In an embodiment of the invention, it is provided that the filter merely surrounds the bolt in a plane running across the extension direction, i.e., circulates around it in a closed annular manner, namely particularly over the whole length of the bolt along the extension direction of the bolt.

In an alternative embodiment of the invention, it is provided that the filter surrounds the bolt as well as the throttle connected thereto in a plane running across the extension direction, namely particularly over the whole length of the unit bolt/throttle along said extension direction.

Furthermore, the problem according to the invention is solved by a method for producing a gas generator.

The method according to the invention provides for the following steps:
  providing a housing of the gas generator, and
  inserting a filter for filtering a gas that can be generated by the gas generator into the housing of the gas generator such that a part of the gas generator is inserted into a recess of the filter, particularly pressed in, in order to fasten the filter to the housing.

Particularly, said part of the gas generator is inserted (pressed in) along an extension direction of the housing into said recess for fixing the filter to the housing upon arranging the filter in the housing, so that the filter widens (broadens) across said extension direction and therefore presses against an inside of the housing facing the filter, which inside extends along the extension direction and circulates across said extension direction.

Particularly, prior to arranging the filter in the housing, a sealing is arranged in the housing, so that said sealing comes to rest on a boundary region of the housing delimiting an outflow opening of the gas generator. Particularly, the sealing is a closed annular sealing (so-called o-ring). Through said outflow opening of the gas generator, gas generated by the gas generator can flow out of the housing of the gas generator into an outer space surrounding the gas generator. Said outflow opening can also form a flow channel, which distributes the gas over several (proper) openings of the housing of the gas generator communicating with the outer space.

Furthermore, a throttle is particularly inserted into the housing of the gas generator in a way that said throttle comes to rest on said boundary region of the outflow opening with interposition of the sealing, wherein the throttle is particularly arranged in the housing such that the part protrudes from the throttle in the form of a bolt extending along the extension direction.

The described features and advantages of the invention shall be pointed out by means of the following descriptions of Figures of embodiments.

FIG. 1 shows by means of a schematical cross sectional view a gas generator 1 extending along an extension direction E in the form of a tubular gas generator. The gas generator 1 serves for generating a gas, by means of which in case of a crash a gas sack of an airbag module can be inflated in or at a motor vehicle for protecting a person.

The gas generator 1 comprises a housing 2 for carrying the components of the gas generator 1. Thereby, the housing 2 is formed hollow-cylindrical and defines an inner space I of the gas generator 1. The cylinder axis 20 of the housing 2 is oriented along the extension direction E.

The housing 2 comprises an inside 2a facing the inner space I, which circulates in a closed manner in a plane lying perpendicular to the cylinder axis 20.

An outflow opening 7 is provided at a front side 2b of the housing 2 running across the extension direction E or cylinder axis 20, through which outflow opening 7 gas generated in the inner space I of the housing 2 can flow into an outer space surrounding the housing 2.

Thereby, said outflow opening 7 communicates with a plurality of openings 151 of a diffusor 15 of the housing 2, which is provided at the front side 2b of the gas generator 1. Gas escaping from the outflow opening 7 flows out of the gas generator 1 (housing 2) through these openings 151, wherein said openings 151 are arranged such that the gas flows out of the housing 2 of the gas generator 1 as neutral with respect to momentum as possible.

For inflating a gas sack that is not shown, the openings 151 can be suitably arranged with respect to the gas sack. Particularly, the openings 151 or the diffusor 15 are arranged in an inner space of the gas sack to be inflated.

The outflow opening 7 is delimited by a boundary region 8, which extends in a plane running perpendicular to the extension direction E and circulates annularly along said plane.

For sealing the outflow opening 7, a sealing 6 elastically prestressed along the extension direction E is provided, which sealing has a through-opening, which is designed congruent with respect to the outflow opening 7 of the housing 2. The sealing 6 evenly rests on the said boundary region 8.

Furthermore, the gas generator 1 comprises a throttle 5 having a wall 56, which circulates across the extension direction E and is arranged spaced apart with respect to the inside 2a of the housing 2 (in a plane running perpendicular to the extension direction E). Said wall 56 comprises a circulating boundary region 55 facing the sealing 6, via which the throttle 5 rests on the boundary region 8 of the housing 2, namely with interposition of the sealing 6.

The throttle 5 comprises a plurality of throttle openings 51, which are formed in said wall 56. Between the throttle openings 51 and the outflow opening 7, a flow connection exists, so that gas generated in the inner space I of the housing 2 can get through the throttle openings 51 via the outflow opening 7 and the openings 151 of the diffusor 15 into the outer space.

In order to filter said gas, a filter 3 is provided. This filter 3 is designed hollow cylindrical and comprises a recess in the form of a cylindrical through-opening 30 running along the extension direction E or along the cylinder axis 22, whose cylinder axis coincides with the cylinder axis 20 of the housing 2. Furthermore, the filter 3 comprises an outside 32, which faces the inside 2a of the housing 2.

The filter 3 is now arranged in the inner space I of the gas generator 1 such that a part 4 in the form of a bolt protruding from the throttle 5 towards the filter 3, which can be integrally formed with the throttle 5, is inserted along the extension direction E or the cylinder axis 20 into the recess 30 of the filter 3, wherein said bolt 4 broadens the filter 3—whose outside 32, in case of a bolt 4 that is not inserted, is arranged in the inner space I having play with respect to the inside 2a—across the extension direction E, so that the filter 3 is pressed with its outside 32 against the inside 2a of the housing 2 by the bolt 4. Thereby, an outside 53 of the bolt 4 facing the inside 2a of the housing 2 tightly butts against an inside 32 of the filter 3 delimiting the recess 30. Hereby, the filter 3 is fixed in the housing 2.

At the same time, the boundary region 55 of the wall 56 is hereby pressed against the sealing 6 and the outflow opening 7 is sealed.

The propellant 9 of the gas generator 1 is arranged in the inner space I of the housing 2 between the filter 3 and a damping plate 10 with respect to the extension direction E, which damping plate 10 prestresses the propellant 9 against the filter 3 or fills out a volume of the inner space I that is not occupied by the propellant 9.

The propellant 9 is ignited by means of an igniter 13 that can be activated by means of a suitable electronics on the vehicle side. The igniter 13 thereby engages with a free end portion 13a through a through-opening 10a of the damping plate 10, so that the propellant 9 butts against said free end portion 13a of the igniter 13.

The igniter 13 is held by a retaining element 11 that is crimped with a free end portion 2b of the housing 2, which faces the diffusor 15 along the extension direction E. For sealing the housing 2 at said free end portion 2c, a sealing element 12 is provided that is arranged in a groove 11a circulating at the retaining element 11 and is prestressed against the inside 2a of the housing 2 as well as against the retaining element 11.

Furthermore, the igniter 13 comprises electrical contacts 13b for activating the igniter 13, which are passed through a through-opening 11b of the retaining element 11 out of the inner space I of the housing 2. For sealing said through-opening 11b of the retaining element 11, a sealing means 14 is provided that is located in a corresponding recess of the retaining element 11.

In case of the gas generator 1 shown in FIG. 1, the filter 3 is merely pressed with the bolt 4. I.e., merely said bolt 4 is arranged in the recess 30 of the filter 3, the throttle 5 including wall 56 protrudes along the extension direction E from the filter 3, namely towards the diffusor 15 or the outflow opening 7.

Figure 2:
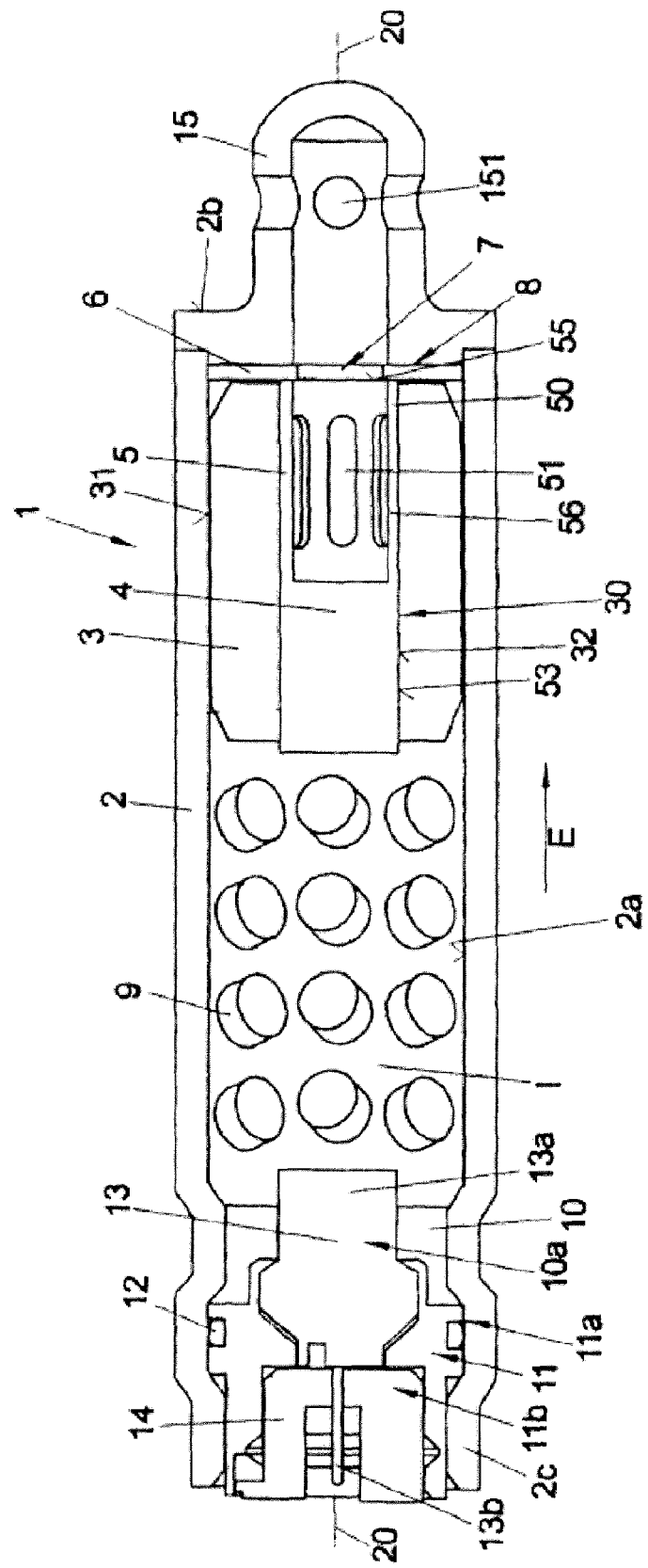
FIG. 2: shows a schematical cross sectional view of a second embodiment of a gas generator according to the invention.

On the other hand, in case of the embodiment according to FIG. 2, the unit formed out of the bolt 4 and the throttle 5 is, in contrast to FIG. 1, formed as a cylinder having a uniform outer diameter, wherein the bolt 4 and the throttle 5 are completely arranged in the recess 30 of the filter 3.

During production of the gas generator 1, the sealing 6 is at first laid into the housing 2, so that it comes to rest on the bottom region 8 of the housing 2. Thereafter, the throttle 5 including bolt 4 is laid into the housing 2, so that the throttle 5 is supported via the boundary region 55 of the wall 56 on the sealing 6. Hereafter, the filter 3 is pressed onto the bolt 4 or the bolt 4 and the throttle 5 as described above, wherein the sealing 6 is prestressed against the boundary region 8 of the housing 2 and the boundary region 55 of the wall 56 and the filter 3 is clamped with the housing 2.

In particular, it is also possible that prior to arranging the filter 3 in the housing 2, a sealing 6 is arranged in the housing 2, so that said sealing 6 rests on a boundary region 8 of the housing 2 delimiting an outflow opening 7 of the gas generator 1.

Furthermore, the method can be characterized by arranging a throttle 5 in the housing 2, so that the throttle 5 rests on said boundary region 8 with interposition of the sealing 6.

The priority application, German Patent Application No. 10 2008 050 763.6, filed Oct. 8, 2008, including the specification, drawing, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed from the present disclosure within the scope and spirit of the present invention are to be included as further embodiments of the present invention. The scope of the present invention is to be defined as set forth in the following claims.

The priority application, German Patent Application Number 10 2008 050 763.6, filed on Oct. 8, 2008 is incorporated by reference herein.

The invention claimed is:

1. A gas generator, comprising:
    a housing that defines an inner space of the gas generator and includes an inside facing the inner space;
    a filter fastened in the housing for filtering gases that the gas generator is configured to generate, wherein the filter includes an outside;
    an outflow opening through which gas generated in the inner space is configured to flow into an outer space surrounding the housing, wherein the outflow opening is delimited by a boundary region;
    a sealing part for sealing the outflow opening; and
    a throttle having a wall,
    wherein a part of the gas generator is inserted into a recess of the filter for fastening the filter in the housing,
    wherein the part is configured and provided to widen the filter so that the filter is pressed against the housing for fastening the filter in the housing,
    wherein said part of the gas generator is formed as a bolt that protrudes from the throttle,
    wherein the bolt broadens the filter, and
    wherein the outside of the filter, when the bolt is not inserted into the recess, is in the inner space having play with respect to the inside, and wherein the outside of the filter is pressed against the inside of the housing and simultaneously a circulating boundary region of the wall of the throttle is pressed against the sealing and seals the outflow opening, when the bolt is inserted into the recess.

2. The gas generator as claimed in claim 1, wherein the filter encompasses the part of the gas generator.

3. The gas generator as claimed in claim 1, wherein the throttle is arranged in the housing.

4. The gas generator as claimed in claim 3, wherein the bolt is integrally formed with the throttle.

5. The gas generator as claimed in claim 1, wherein the housing extends along an extension direction.

6. The gas generator as claimed in claim 5, wherein the bolt protrudes along the extension direction from the throttle.

7. The gas generator as claimed in claim 6, wherein the housing is formed at least in sections as a hollow cylinder having a cylinder axis coinciding with the extension direction.

8. The gas generator as claimed in claim 5, wherein the filter surrounds the bolt in a plane running across the extension direction.

9. The gas generator as claimed in claim 1, wherein the recess is formed as a through-opening.

10. The gas generator as claimed in claim 9, wherein the through-opening aligns with the extension direction.

11. The gas generator as claimed in claim 1, wherein the filter is formed at least in sections as a hollow cylinder.

12. The gas generator as claimed in claim 11, wherein the hollow cylinder of the filter comprises a cylinder axis, which coincides with a cylinder axis of the housing.

13. A method for producing a gas generator, comprising the steps of:
    providing a housing that defines an inner space of the gas generator and includes an inside facing the inner space;
    arranging a filter in the housing for filtering gases that the gas generator is configured to generate, wherein the filter includes an outside;
    providing an outflow through which gas generated in the inner space is configured to flow into an outer space surrounding the housing, wherein the outflow opening is delimited by a boundary region;
    providing a sealing part for sealing the outflow opening; and
    providing a throttle having a wall,
    wherein a part of the gas generator is inserted into a recess of the filter in order to fix the filter in the housing,
    wherein the part of the gas generator is inserted into said recess along an extension direction of the housing for fixing the filter in the housing, so that the filter widens across said extension direction and pushes against an inside of the housing facing the filter, wherein the part of the gas generator is formed as a bolt that protrudes from the throttle, wherein the bolt broadens the filter, and wherein the outside of the filter, when the bolt is not inserted into the recess, is in the inner space having play with respect to the inside, and wherein the outside of the filter is pressed against the inside of the housing and simultaneously a circulating boundary region of the wall of the throttle is pressed against the sealing and seals the outflow opening, when the bolt is inserted into the recess.

14. The method as claimed in claim 13, wherein the throttle is arranged in the housing.

* * * * *